(12) United States Patent
Imamura et al.

(10) Patent No.: US 10,964,960 B2
(45) Date of Patent: Mar. 30, 2021

(54) FUEL CELL VEHICLE AND FUEL GAS DETECTOR FOR FUEL CELL

(71) Applicant: HONDA MOTOR CO., LTD., Tokyo (JP)

(72) Inventors: Yuki Imamura, Wako (JP); Yu Kumekawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 125 days.

(21) Appl. No.: 16/369,405

(22) Filed: Mar. 29, 2019

(65) Prior Publication Data

US 2019/0305340 A1    Oct. 3, 2019

(30) Foreign Application Priority Data

Mar. 30, 2018   (JP) .................................. 2018-067082
Mar. 30, 2018   (JP) .............................. JP2018-067087

(51) Int. Cl.
*H01M 8/04082*   (2016.01)
*H01M 8/0267*   (2016.01)
*H01M 8/2475*   (2016.01)
*H01M 8/04089*   (2016.01)
*H01M 8/1018*   (2016.01)

(52) U.S. Cl.
CPC ..... *H01M 8/04201* (2013.01); *H01M 8/0267* (2013.01); *H01M 8/04089* (2013.01); *H01M 8/2475* (2013.01); *H01M 2008/1095* (2013.01); *H01M 2250/20* (2013.01)

(58) Field of Classification Search
CPC ........... H01M 8/0444; H01M 8/04201; H01M 8/04089; H01M 2250/20; Y02T 90/40
See application file for complete search history.

(56) References Cited

U.S. PATENT DOCUMENTS

| | | | |
|---|---|---|---|
| 2015/0270562 A1 | 9/2015 | Naito et al. | |
| 2016/0167521 A1* | 6/2016 | Lo ..................... | H01M 8/04201 137/260 |
| 2019/0109331 A1* | 4/2019 | Skala ................. | H01M 8/04111 |

FOREIGN PATENT DOCUMENTS

| | | |
|---|---|---|
| JP | 2015-023598 | 2/2015 |
| JP | 2015-193370 | 11/2015 |

* cited by examiner

*Primary Examiner* — Ladan Mohaddes
(74) *Attorney, Agent, or Firm* — Amin, Turocy & Watson, LLP

(57) ABSTRACT

A fuel cell stack is located in a front room of a fuel cell vehicle. The fuel cell stack is connected to a fuel gas guide passage extending to a widthwise central part in front of a windshield of the fuel cell vehicle. When a fuel gas is leaked from the fuel cell stack, the fuel gas is guided by the fuel gas guide passage and discharged from a discharge outlet formed in the widthwise central part through an opening formed in a hollow cover to the outside. The fuel gas guide passage is connected to a filter case in a fuel gas detector for fuel cells.

9 Claims, 4 Drawing Sheets

FUEL CELL VEHICLE AND FUEL GAS DETECTOR FOR FUEL CELL

CROSS-REFERENCE TO RELATED APPLICATIONS

This application is based upon and claims the benefit of priority from Japanese Patent Applications No. 2018-067082 filed on Mar. 30, 2018 and No. 2018-067087 filed on Mar. 30, 2018, the contents all of which are incorporated herein by reference.

BACKGROUND OF THE INVENTION

Field of the Invention

The present invention relates to a fuel cell vehicle equipped with a fuel cell stack and a fuel gas detector for fuel cells.

Description of the Related Art

As is widely known, a fuel cell stack is provided by stacking a predetermined number of power generation cells. A fuel gas is supplied to an anode and an oxygen-containing gas is supplied to a cathode, whereby the fuel cell stack generates an electric power. The fuel cell stack can be used as a stationary battery, and can be used in a vehicle as a power source for a motor for driving the vehicle. In the latter case, the fuel cell stack is placed in a stack case, and the stack case is attached to a vehicular body of the vehicle. The vehicle equipped with the fuel cell stack is hereinafter referred to as the fuel cell vehicle.

In the fuel cell vehicle, the fuel gas may be leaked from the fuel cell stack to a space inside the stack case, for example, because a fastener member such as a bolt or a nut may be loosened due to vibration during driving. In view of this problem, a fuel gas detector for detecting the fuel gas leakage in fuel cells is proposed in Japanese Laid-Open Patent Publication No. 2015-023598.

The fuel cell vehicle is driven also in the rain. Therefore, for example, a foreign material such as rain water or sand may penetrate through an exhaust duct into the stack case containing the fuel cell stack, and the fuel cell stack may be damaged by the foreign material.

A filter may be used for preventing the penetration of the foreign material from the outside. However, when the filter is clogged, the fuel gas cannot be readily discharged.

In a structure proposed in Japanese Laid-Open Patent Publication No. 2015-193370, a guide pipe (i.e. a duct member described in this publication) is attached to the stack case to efficiently discharging the fuel gas to the outside. By using the guide pipe, the leaked fuel gas in the stack case is introduced to a side fender in the vehicle vehicular body, and is discharged to the outside.

SUMMARY OF THE INVENTION

An object of the present invention is to provide a fuel cell vehicle capable of minimizing a pressure loss in a process of discharging a leaked fuel gas.

Another object of the present invention is to provide a fuel cell vehicle capable of reducing a weight of a guide flow path for guiding a fuel gas.

A further object of the present invention is to provide a fuel gas detector for fuel cells capable of easily recognizing clogging of a filter.

According to an aspect of the present invention, there is provided a fuel cell vehicle comprising a fuel cell stack arranged in a front room in a vehicular body of the fuel cell vehicle, wherein the fuel cell stack is connected to a fuel gas guide passage for guiding a fuel gas leaked from the fuel cell stack, the fuel gas guide passage extends to a widthwise central part in front of a windshield in the vehicular body, and a discharge outlet is formed in the widthwise central part in front of the windshield in the vehicular body so that a fuel gas having flowed through the fuel gas guide passage is discharged from the discharge outlet.

In the present invention, as described above, the fuel gas guide passage for guiding the fuel gas leaked from the fuel cell stack extends to the widthwise central part in front of the windshield of the vehicle vehicular body. Therefore, the fuel gas guide passage used in the present invention has a length smaller than that of a conventional guide passage extending to a side fender in the vehicle vehicular body. Thus, the weight of the fuel gas guide passage can be reduced in the present invention. Furthermore, the fuel gas flow path can be shortened, so that the pressure loss can be reduced in the fuel gas flow. Consequently, the weight reduction and simplification of the fuel gas guide passage can be achieved, and the reduction of the pressure loss can be achieved in the present invention.

The fuel gas guide passage may be provided in plural. In this case, the plurality of the fuel gas guide passages may be joined together in a joint portion in the widthwise central part in front of the windshield in the vehicular body. Even in the case of using a plurality of the fuel gas guide passages, by locating the joint portion in the widthwise central part, the guide passages can extend to the widthwise central part. The discharge outlet may be located downstream of the joint portion.

It is preferred that a fuel gas sensor is located upstream of the discharge outlet. By using the fuel gas sensor for detecting the fuel gas, a user can readily recognize leakage of the hydrogen gas.

It is preferred that the fuel gas guide passage extends from an upper surface of the fuel cell stack to the widthwise central part in front of the windshield in the vehicular body. The hydrogen gas contained in the fuel gas is a lightweight gas, and thereby is easily moved upward. Therefore, the hydrogen gas can be easily collected above the fuel cell stack.

It is preferred that a filter case containing a filter for the fuel gas is located between the fuel gas guide passage and the discharge outlet. In this case, when the fuel gas flows together with a foreign material through the fuel gas guide passage, the foreign material can be removed by the filter.

It is preferred that the filter case has a flow path for the fuel gas. The fuel gas flows downward in the flow path and passes through the filter, and then flows upward in the flow path. In this case, the flow path has a so-called labyrinth structure. Therefore, even when the foreign material is introduced from the discharge outlet, the foreign material cannot penetrate into the fuel cell stack through the flow path. Consequently, the penetration of the foreign material into the fuel cell stack can be prevented.

Specifically, for example, a filter chamber containing the filter may be formed in the filter case, and a guide wall extending from a bottom wall toward a ceiling wall of the filter case may be located downstream of the filter chamber. In this case, it is preferred that a drain chamber is located between the guide wall and the discharge outlet. The foreign material is discharged from the drain chamber to the outside of the filter case. Consequently, the penetration of the foreign material into the fuel cell stack can be prevented more effectively.

For example, the discharge outlet may be formed on a vehicular front side of the filter case. In this case, the fuel gas guide passage used in the present invention has a length smaller than that of a conventional guide passage extending to a discharge outlet formed on a side fender. Consequently, the size reduction and weight reduction of the fuel gas detector can be achieved in the present invention.

It is preferred that the discharge outlet is covered with a cover for guiding the fuel gas in the widthwise direction of the fuel cell vehicle. In other words, it is preferred that the discharge outlet is protected by the cover. In this case, when the fuel cell vehicle is driven in the rain, penetration of rain water or dirt from the discharge outlet in the front of the vehicle vehicular body into the filter case can be effectively prevented.

In the above structure, it is preferred that the fuel cell stack is located in the vicinity of the widthwise central part in front of the windshield in the vehicular body. In this case, the fuel cell stack is arranged in the vicinity of the discharge outlet, so that the fuel gas guide passage can be further shortened. Consequently, the weight reduction and simplification of the fuel gas guide passage can be further effectively achieved, and the pressure loss can be further reduced.

According to an aspect of the present invention, there is provided a fuel gas detector for fuel cells, for detecting a fuel gas leaked from a fuel cell stack, comprising a fuel gas guide passage for guiding the fuel gas leaked from the fuel cell stack and a filter case containing a filter for the fuel gas, wherein the filter case communicates with the fuel gas guide passage via a through-hole formed in an upper portion of the filter case, the filter is located below the through-hole, and a fuel gas sensor for detecting the fuel gas transferred through a sampling hole is located in a position facing the filter above the filter.

With this arrangement, because the filter acts as a ventilation resistance, the fuel gas is temporarily retained on the upstream side of the filter inside the filter case. after a part of the hydrogen contained in the retained fuel gas has passed through the sampling hole, the fuel gas sensor detects the hydrogen. Since hydrogen is lighter than air and easily ascends, it is easy to detect the hydrogen by a fuel gas sensor disposed at a higher position. As a result, it is possible to detect the hydrogen concentration with high accuracy.

When the hydrogen gas is constantly leaked and the filter is not clogged, the fuel gas sensor provides an approximately constant detection result, i.e. an approximately constant fuel gas concentration. When the filter is clogged, the fuel gas is not readily transferred through the filter. The fuel gas concentration is increased in the upstream portion of the filter. When the increase of the fuel gas concentration is detected by the fuel gas sensor fuel gas, an alert is shown (for example, a warning light is turned on) in an instrument panel), whereby the user of the fuel cell stack can recognize the clogging of the filter.

It is preferable to locate the sampling hole upstream of the filter, and have the fuel gas flow downward through the filter in the direction of gravity. With this arrangement, it is possible to detect the fuel gas concentration with high accuracy.

Two of the fuel gas guide passages and two of the through-holes may face each other in the filter case. In this way, it is possible to achieve substantially uniform flow of the fuel gas in the filter case. In this case, a fuel gas sensor may be arranged between the two through-holes.

A discharge outlet for discharging the hydrogen having flowed through the two fuel gas guide passages and joined together may be formed in an upper portion of the filter case where the two fuel gas guide passages are merged. With this arrangement, the distance from the filter case to the discharge outlet can be shortened. As a result, the fuel gas detector for fuel cells can be made simple and light in weight.

The sampling hole may be located at an offset distance from the through-hole. With this arrangement, it is possible to prevent the fuel gas having flowed from the through-hole into the filter case from directly flowing into the fuel gas sensor. In this manner, it is possible to prevent uneven detection results (measured value). The fuel gas concentration can be obtained stably and accurately.

The filter case may have a flow path for the fuel gas to change the flow direction of the fuel gas. In this case, the flow path may have a plurality of turning points, forming a so-called labyrinth structure. Therefore, even when the foreign material is introduced from the discharge outlet, the foreign material cannot penetrate into the fuel cell stack through the flow path. Consequently, the penetration of the foreign material into the fuel cell stack can be prevented.

The fuel gas detector may be mounted on a vehicle. The discharge outlet for discharging the fuel gas having flowed through the fuel gas guide passage may be formed on a vehicle front side of the filter case (forward direction in the traveling direction). In this case, the fuel gas guide passage has a length smaller than that of a guide passage extending to a discharge outlet formed on a side fender. Consequently, the size reduction and weight reduction of the fuel gas detector for fuel cells can be achieved.

It is preferred that the discharge outlet is covered with a cover for guiding the fuel gas in the width direction of a vehicle. In other words, it is preferred that the discharge outlet is protected by the cover. In this case, when a fuel cell vehicle is driven in the rain, penetration of rain water or dirt from the discharge outlet in the front of the vehicle vehicular body into the filter case can be effectively prevented.

In the fuel cell vehicle of the present invention, the fuel gas guide passage for guiding the fuel gas leaked from the fuel cell stack extends to the widthwise central part in front of the windshield of the vehicle vehicular body. Therefore, the fuel gas guide passage used in the present invention has a length smaller than that of a conventional guide passage extending to a side fender in the vehicle vehicular body. Thus, the weight of the fuel gas guide passage can be reduced and the structure of the fuel gas guide passage can be simplified in the present invention. Furthermore, the fuel gas flow path can be shortened, so that the pressure loss can be reduced in the fuel gas flow. Consequently, the fuel gas can be easily discharged to the outside.

In the fuel gas detector for the fuel cells of the present invention, the filter is located on the fuel gas flow path in a lower portion in the filter case and acts as a ventilation resistance, and the fuel gas sensor is located above the filter. In this structure, the fuel gas remains for a while in a portion upstream of the filter in the filter case. Therefore, the fuel gas can be accurately detected by the fuel gas sensor.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A preferred embodiment of the fuel cell vehicle and the fuel gas detector of the present invention will be described in detail below with reference to accompanying drawings. The words of front, rear, left, and right described below mean those of a user sitting on a driver seat. In this embodiment, a hydrogen gas, a compressed air, and a coolant water are used as a fuel gas, an oxygen-containing gas, and a cooling medium respectively.

Figure 1:
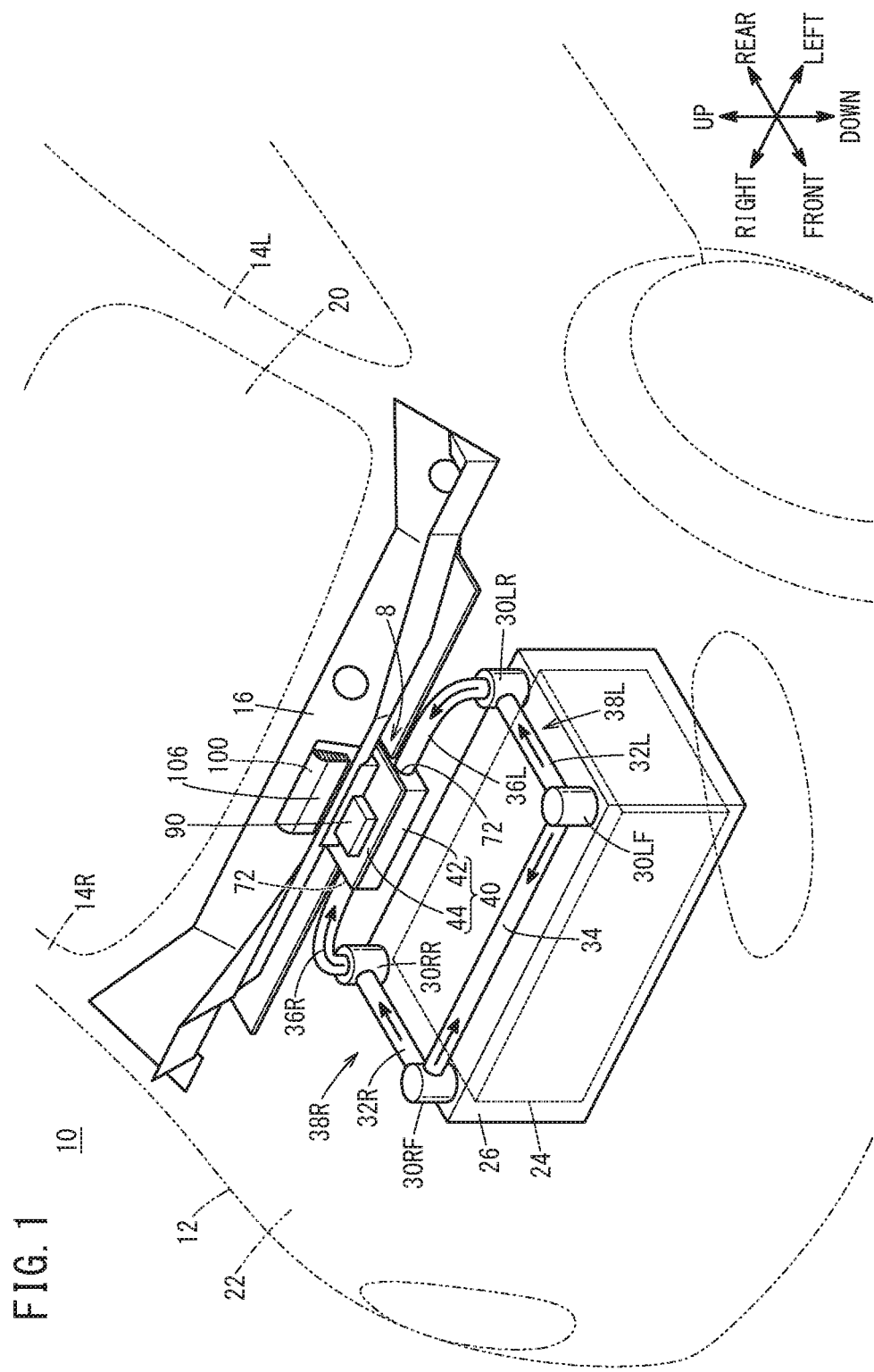
FIG. 1 is a schematic perspective view of a fuel cell vehicle equipped with a fuel gas detector for a fuel cell.

FIG. 1 is a schematic perspective view of a fuel cell vehicle 10 equipped with a fuel gas detector 8 for fuel cells. The vehicular body of the fuel cell vehicle 10 has a front nose 12, a left pillar 14L, a right pillar 14R, and a roof (not shown). The front nose 12 has an openable and closable bonnet (not shown). A windshield (front glass) 20 is fitted in a frame defined by a cowl top 16, the left pillar 14L, the right pillar 14R, and the roof. In a front room 22 in the bonnet of the front nose 12, a fuel cell stack 24 is located in the vicinity of a center of a space in front of the windshield 20. Thus, the fuel gas detector 8 and the fuel cell stack 24 are attached to the vehicular body to provide the fuel cell vehicle 10.

The fuel cell stack 24 contains a stack of a predetermined number of power generation cells. The power generation cell contains a pair of separators and a membrane electrode assembly (MEA) sandwiched between the separators. The membrane-electrode assembly has an anode and a cathode, and further has a solid polymer electrolyte membrane interposed therebetween. This structure of the power generation cell has been widely known, and therefore drawing and detailed explanations thereof are omitted.

The fuel cell stack 24 is placed in a stack case 26, and the stack case 26 is located and fixed in the front room 22. Although not shown in the drawings, a hydrogen supply pipe for supplying the hydrogen gas to the anode, a hydrogen discharge pipe for discharging the hydrogen gas from the anode, an air supply pipe for supplying the compressed air to the cathode, an air discharge pipe for discharging the compressed air from the cathode, a coolant water supply pipe for supplying the coolant water to an appropriate portion in the fuel cell stack 24, and a coolant water discharge pipe for discharging the coolant water from the fuel cell stack 24 are connected to the stack case 26.

The stack case 26 has an approximately rectangular shape. Four outlet holes are formed in the four corners (the left front corner, left rear corner, right front corner, and right rear corner) of the upper surface of the stack case 26. A left front pipe joint 30LF, a left rear pipe joint 30LR, a right front pipe joint 30RF, and a right rear pipe joint 30RR are fitted into the outlet holes respectively. Two guide pipes of the fuel gas detector 8 are connected to the pipe joints.

Specifically, the front end of a left guide pipe 32L and the left end of a front guide pipe 34 are each connected to a side of the left front pipe joint 30LF. The right end of the front guide pipe 34 and the front end of a right guide pipe 32R are each connected to a side of the right front pipe joint 30RF. The rear end of the left guide pipe 32L and the left end of a left collecting guide pipe 36L are connected to a side and top of the left rear pipe joint 30LR respectively. The rear end of the right guide pipe 32R and the right end of a right collecting guide pipe 36R are connected to a side and top of the right rear pipe joint 30RR respectively.

The front guide pipe 34, the left guide pipe 32L, and the right guide pipe 32R each have an approximately straight shape. Thus, the front guide pipe 34, the left guide pipe 32L, and the right guide pipe 32R each extend along the upper surface of the stack case 26.

The left collecting guide pipe 36L and the right collecting guide pipe 36R each have an approximately L shape. As described above, the left end of the left collecting guide pipe 36L and the right end of the right collecting guide pipe 36R are connected to the tops of the left rear pipe joint 30LR and the right rear pipe joint 30RR respectively. Therefore, the left collecting guide pipe 36L and the right collecting guide pipe 36R are located above the front guide pipe 34, the left guide pipe 32L, and the right guide pipe 32R in the vehicular body. The left collecting guide pipe 36L and the right collecting guide pipe 36R do not have to be located just above the stack case 26, and may be inclined rearward from the stack case 26.

A left fuel gas guide passage 38L is formed by the front guide pipe 34, the left guide pipe 32L, and the left collecting guide pipe 36L, while a right fuel gas guide passage 38R is formed by the front guide pipe 34, the right guide pipe 32R, and the right collecting guide pipe 36R. Thus, the dual fuel gas guide passage is formed in this embodiment. The front guide pipe 34 is used in both of the left fuel gas guide passage 38L and the right fuel gas guide passage 38R. As long as the left fuel gas guide passage 38L and the right fuel gas guide passage 38R contain the left collecting guide pipe 36L and the right collecting guide pipe 36R respectively, they do not have to contain the other pipes.

The left collecting guide pipe 36L and the right collecting guide pipe 36R extend from the upper surface of the stack case 26 (the fuel cell stack 24) to a widthwise central part in front of the windshield 20. The structure of this embodiment can have smaller lengths of the left collecting guide pipe 36L and the right collecting guide pipe 36R as compared with a conventional structure having guide pipes extending to a discharge outlet formed around a side fender. Consequently, weight reduction of the left collecting guide pipe 36L and the right collecting guide pipe 36R can be achieved in the present invention.

The right end of the left collecting guide pipe 36L and the left end of the right collecting guide pipe 36R are connected to a filter case 40 located in the widthwise central part. Thus, the left collecting guide pipe 36L and the right collecting guide pipe 36R are joined together in the filter case 40. The filter case 40 is supported by the cowl top 16 as described below.

Figure 2:
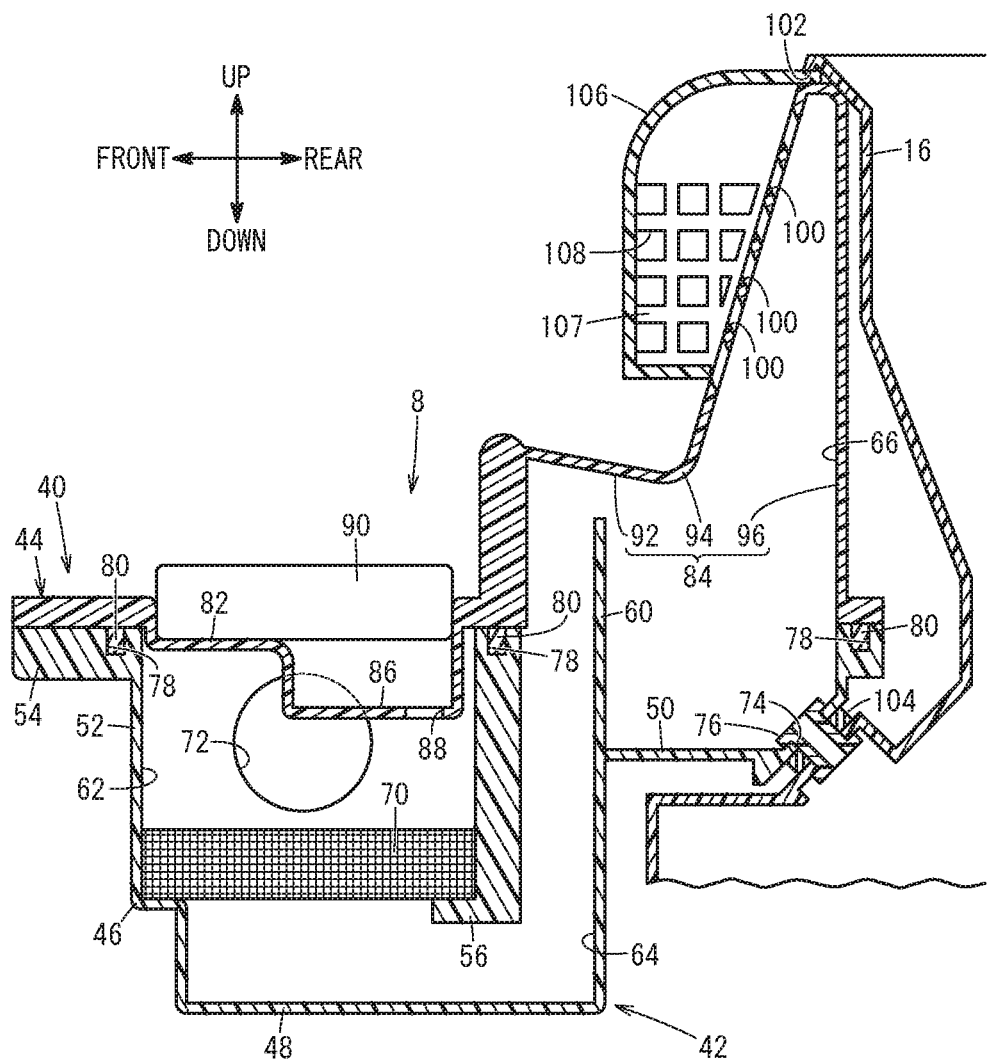
FIG. 2 is a schematic cross-sectional side view of a filter case for the fuel cell vehicle of FIG. 1.

FIG. 2 is a schematic cross-sectional side view of the filter case 40. The filter case 40 contains a combination of a first case member (lower case member) 42 and a second case member (upper case member) 44. It is to be understood that the first case member 42 and the second case member 44 are hollow members. The filter case 40 may contain three or more members.

The first case member 42 has a bottom wall, a side wall 52, and a rectangular flange 54. The bottom wall contains a first bottom wall 46, a second bottom wall 48, and a third bottom wall 50 arranged in this order in the direction from the front to the rear. The side wall 52 extends approximately perpendicularly from the first bottom wall 46, the second bottom wall 48, and the third bottom wall 50. The rectangular flange 54 protrudes from the side wall 52 around the upper opening of the first case member 42. In the bottom wall, the second bottom wall 48 is located in the lowermost position in the vertical direction of the vehicle vehicular body (the gravitational direction), and the third bottom wall 50 is located in the uppermost position. Thus, there is a smaller difference in level between the first bottom wall 46 and the second bottom wall 48, and there is a larger difference in level between the second bottom wall 48 and the third bottom wall 50.

A partition wall 56 having a cross section with an approximately L shape and a guide wall 60 protruding from the second bottom wall 48 are formed in the first case member 42. The left and right ends of the partition wall 56 and the guide wall 60 are connected to the inner surface of the side wall 52. Therefore, the inside of the filter case 40 is divided into a filter chamber 62, a direction change chamber 64, and a drain chamber 66 by the partition wall 56 and the guide wall 60.

A horizontal portion of the partition wall 56 is arranged at the same level as the first bottom wall 46, and a filter 70 is disposed on an upper surface of the horizontal portion and an upper surface of the first bottom wall 46. The filter 70 preferably has a gas-permeable and liquid-non-permeable structure. For example, the filter 70 may be a salt-resistant filter. Examples of materials for the filter 70 include sponge-like porous materials and non-woven fabrics.

A pair of through-holes 72 are formed on upper portions of the left and right side surfaces of the filter chamber 62, and the left collecting guide pipe 36L and the right collecting guide pipe 36R are connected to the through-holes 72. Therefore, the hydrogen gas contained in an exhaust gas (a mixture gas of the fuel gas and the air) is introduced through the through-holes 72 into an upper portion of the filter chamber 62, and then passes through the filter 70 located in a lower portion. Although only the through-hole 72 for the right collecting guide pipe 36R is shown in FIG. 2, the filter case 40 has also the through-hole 72 for the left collecting guide pipe 36L as shown in FIG. 1. The through-holes 72 are arranged facing each other in the filter case 40.

As described above, the second bottom wall 48 extends rearward from the first bottom wall 46, a small step being formed between the first bottom wall 46 and the second bottom wall 48. The guide wall 60 extends upward from the second bottom wall 48, and the third bottom wall 50 extends rearward therefrom to form a bent structure. The direction change chamber 64 corresponds to a space formed by the guide wall 60 and the vertical portion of the partition wall 56. The rear end of the third bottom wall 50 is inclined, and a drain outlet 74 is formed in the inclined portion. A drain tube 76 is attached to the drain outlet 74.

Engagement grooves 78 are formed on the upper surfaces of the rectangular flange 54 and the partition wall 56. Sealants 80 are inserted into the engagement grooves 78, and a lower surface of the second case member 44 is located on the sealants 80. The first case member 42 and the second case member 44 are used in combination in this manner.

The second case member 44 contains a first cover 82 for the filter chamber 62 and a second cover 84 for the direction change chamber 64 and the drain chamber 66. The first cover 82 has a depression 86 facing the filter chamber 62, and a sampling hole 88 is formed in the bottom wall of the depression 86. The sampling hole 88 is located at an offset distance from the through-holes 72 in the front-back direction.

The depression 86 may be filled with a porous material. The first cover 82 may have a flat shape with no depression 86.

A hydrogen sensor (fuel gas sensor) 90 is located and fixed on the upper surface of the first cover 82. For example, the hydrogen sensor 90 may be a catalytic combustion sensor, a heat transfer sensor, an ultrasonic sensor, or the like. The hydrogen sensor 90 is used for detecting the hydrogen gas transferred through the sampling hole 88. The hydrogen sensor 90 is located above the filter 70, and is arranged facing the filter 70.

The second cover 84 has a first inclined wall 92, a second inclined wall 94, and a vertical wall 96. The first inclined wall 92 is located above the guide wall 60, and is inclined downward in the front-back direction. The second inclined wall 94 is connected to the first inclined wall 92, and is greatly inclined upward in the front-back direction. The vertical wall 96 bends and extends downward from the second inclined wall 94 in an approximately vertical direction. Discharge outlets 100 with a mesh shape are formed on the front surface of the second inclined wall 94.

The filter case 40 having the above structure is located on and fixed to the cowl top 16 by an engagement hook 102 formed in the widthwise central part of the cowl top 16 or by bolts and nuts (not shown) for screw-fixing the drain tube 76 with a sealant 104.

Figure 3:
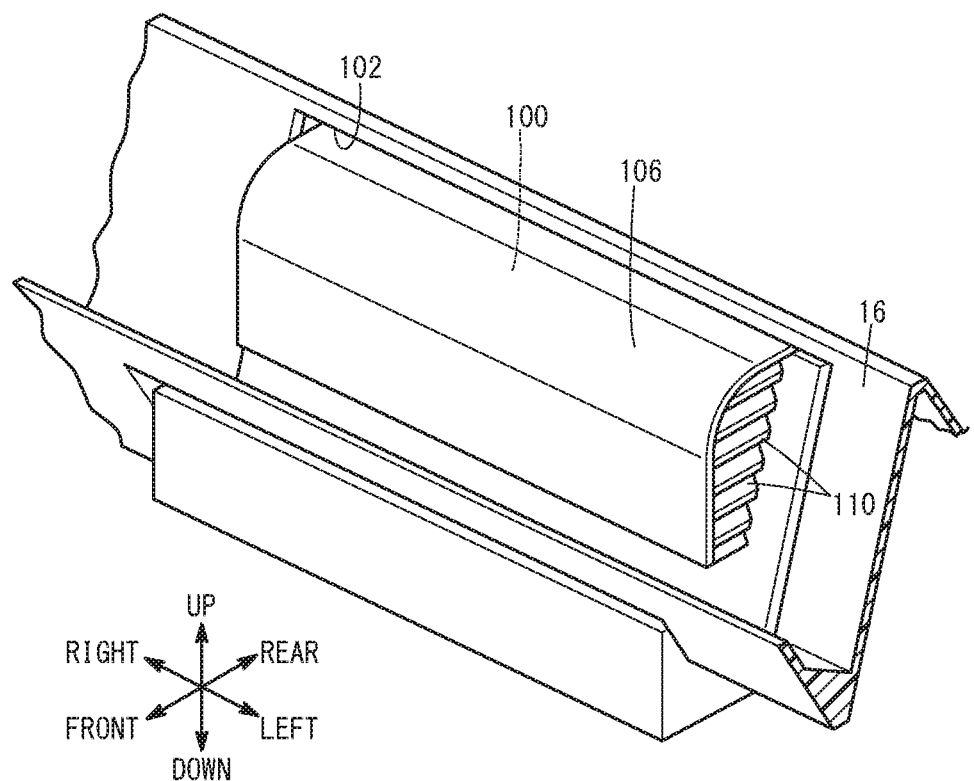
FIG. 3 is an overall schematic perspective view of a cover for a discharge outlet.
Figure 4:
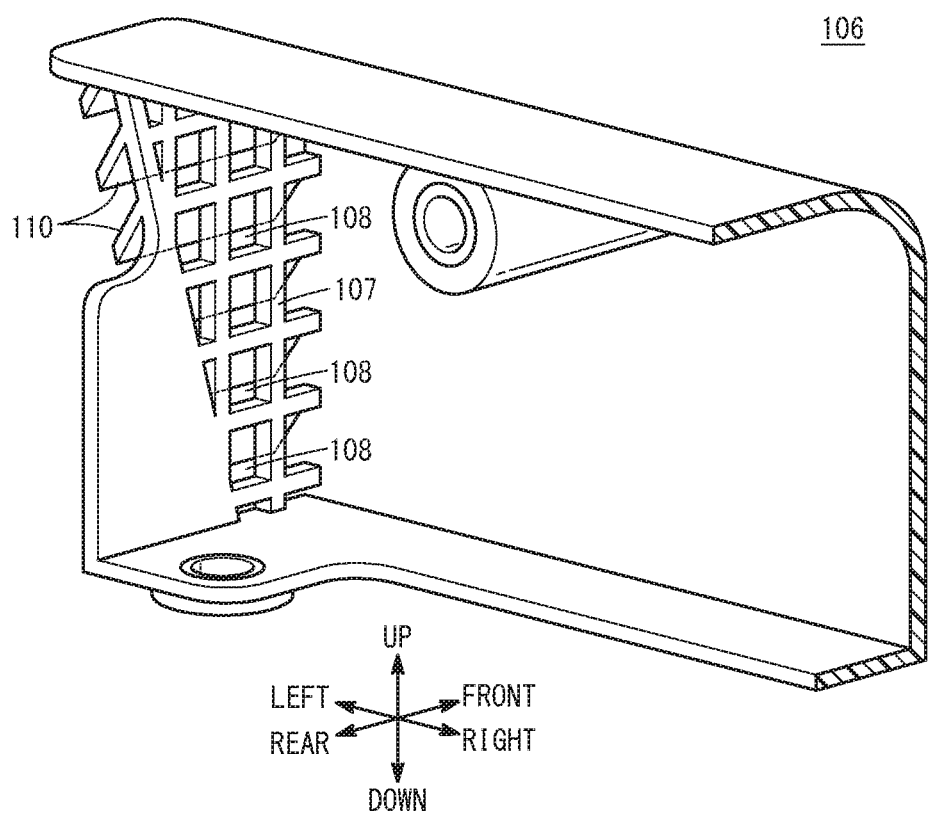
FIG. 4 is a schematic perspective back view of an inner side of the cover of FIG. 3.

As shown in FIG. 3, a hollow cover 106 is attached to the discharge outlet 100. The hollow cover 106 is a hollow vehicular body, and the front surface of the hollow cover 106 is closed by a closing wall. As shown in FIG. 4, a grid wall 107 is formed on either side of the hollow cover 106, whereby openings 108 are formed in a mesh shape. A plurality of louvers 110 are formed in the vicinity of the openings 108. The louver 110 extends outward in the horizontal direction (the width direction), and is inclined downward. As described below, the hydrogen gas penetrates into the hollow structure of the hollow cover 106 on the discharge outlets 100, and is discharged from the openings 108 on the left and right surfaces of the hollow cover 106 in the width direction.

The fuel gas detector 8 and the fuel cell vehicle 10 have the above-described structure. Operations and advantages of the fuel gas detector 8 and the fuel cell vehicle 10 will be described below.

When the fuel cell vehicle 10 is driven, the hydrogen gas and the compressed air are supplied through the hydrogen supply pipe and the air supply pipe to the anodes and the cathodes of the power generation cells in the fuel cell stack 24 respectively. The hydrogen molecules are ionized to generate protons and electrons in the anodes, and the protons and electrons are bonded to oxygen atoms in the compressed air to generate water molecules in the cathodes. The excess portions of the hydrogen gas and the compressed air are discharged from the hydrogen discharge pipe and the air discharge pipe. The coolant water is supplied and circulated through the coolant water supply pipe and the coolant water discharge pipe to cool the fuel cell stack 24.

The hydrogen gas flowing during operation of the fuel cell stack 24, and contained in the fuel cell stack 24 after the fuel cell stack stops operating may be leaked from the fuel cell stack 24 into the stack case 26. In this case, the hydrogen gas is moved upward in the stack case 26 because it is a lightweight gas.

The outlet holes are formed in the four corners of the upper surface of the stack case 26. The hydrogen gas is moved upward in the stack case 26, and is transferred through the left front pipe joint 30LF, the left rear pipe joint 30LR, the right front pipe joint 30RF, and the right rear pipe joint 30RR into the left fuel gas guide passage 38L (the front guide pipe 34, the left guide pipe 32L, and the left collecting guide pipe 36L) or the right fuel gas guide passage 38R (the front guide pipe 34, the right guide pipe 32R, and the right collecting guide pipe 36R). The hydrogen gas is introduced into the filter case 40 from the left collecting guide pipe 36L and the right collecting guide pipe 36R. In this process, the hydrogen gas passes through the through-holes 72 formed on either side of the filter case 40.

As described above, the fuel cell stack 24 is located in the widthwise central part of the front room 22, and the left collecting guide pipe 36L and the right collecting guide pipe 36R extend toward the discharge outlet 100 around the widthwise central part of the cowl top 16. Therefore, the left collecting guide pipe 36L and the right collecting guide pipe 36R can have a smaller length. Thus, each of the left collecting guide pipe 36L and the right collecting guide pipe 36R can have a simple structure and a light weight. In addition, because the left collecting guide pipe 36L and the right collecting guide pipe 36R have the smaller length and a few bent portions, the pressure loss can be effectively lowered. Therefore, the hydrogen gas leaked into the stack case 26 can be easily discharged to the outside.

Since the through-holes 72 are formed in the upper portions of the filter chamber 62 as described above, the hydrogen gas is introduced to the upper portions of the filter chamber 62. Because the top of the filter chamber 62 is closed by the first cover 82, most of the hydrogen gas is moved upward in the filter chamber 62, brought into contact with the first cover 82, and then moved downward in the gravitational direction. The lowered hydrogen gas passes through the filter 70.

The filter 70 acts as a ventilation resistance (or generates a pressure loss). Therefore, the hydrogen gas remains for a while in an upstream portion of the filter 70 in the filter chamber 62. A part of the hydrogen gas retained in the upstream portion passes through the sampling hole 88 formed on the depression 86, and is introduced into the hydrogen sensor 90. Then, the hydrogen sensor 90 acts to detect the hydrogen gas. The hydrogen sensor 90 is located above facing the filter 70 in this manner, and thereby can accurately detect the hydrogen gas when the hydrogen gas in the upstream portion in the filter chamber 62 is moved upward to the first cover 82 due to its light weight.

The sampling hole 88 is formed at an offset distance from the through-holes 72 in the front-back direction. Therefore, when the hydrogen gas is introduced through the through-holes 72 into the filter case 40, the hydrogen gas can be prevented from being transferred directly from the through-holes 72 to the sampling hole 88. Thus, the hydrogen gas can be prevented from being immediately introduced from the through-holes 72 to the hydrogen sensor 90, so that the detected hydrogen concentration value can be prevented from being higher than the actual value. Consequently, the hydrogen concentration can be accurately measured in the present invention.

When the hydrogen gas is constantly leaked and the filter 70 is not clogged, the hydrogen sensor 90 provides an approximately constant detection result, i.e. an approximately constant hydrogen concentration. When the filter 70 is clogged, the hydrogen gas is not readily transferred through the filter 70, so that the hydrogen concentration is increased in the upstream portion of the filter 70 in the filter chamber 62. When the increase of the hydrogen concentration is detected by the hydrogen sensor 90, an alert is shown (for example, a warning light is turned on) in an instrument panel of the fuel cell vehicle 10, whereby the user (a driver of the fuel cell vehicle 10 or the like) can recognize the clogging of the filter 70.

The hydrogen gas is brought into contact with the second bottom wall 48, and is moved rearward. Then, the hydrogen gas is moved upward by the guide of the partition wall 56 and the guide wall 60 in the direction change chamber 64. The flow direction of the hydrogen gas is changed in the direction change chamber 64 in this manner. The hydrogen gas is moved beyond the guide wall 60, and is further moved slightly downward by the guide of the first inclined wall 92 in the second cover 84. Then, the hydrogen gas is introduced into the drain chamber 66 in the rear portion. The drain chamber 66 has a volume larger than that of the direction change chamber 64, so that the flow rate of the hydrogen gas is reduced in the drain chamber 66.

The hydrogen gas is further moved upward along the second inclined wall 94 in the second cover 84, and is discharged through the discharge outlets 100 formed on the front surface of the second inclined wall 94 to the outside of the filter case 40. The discharge outlets 100 is provided with the hollow cover 106 having the hollow structure as described above, and the hydrogen gas is introduced to the inside of the hollow cover 106.

The hollow cover 106 has the closing wall on the front surface, and has the openings 108 formed on the left and right side walls. The hydrogen gas in the hollow structure of the hollow cover 106 is brought into contact with the closing wall, and the flow direction is changed to the width direction. Then, the hydrogen gas is moved in the width direction (the left and right direction) and discharged to the outside from the openings 108 formed on the side walls facing each other. In this process, the hydrogen gas is moved slightly downward in a direction inclined with respect to the horizontal direction by the guide of the louvers 110.

When the fuel cell vehicle 10 is driven in the rain, rain water flows down along the windshield 20 and the cowl top 16, and penetrates into the front room 22 in the bonnet. Because the front openings of the discharge outlets 100 are covered with the hollow cover 106 and the front surface of the hollow cover 106 is covered with the closing wall, penetration of the rain water from the front into the hollow cover 106 or the discharge outlets 100 can be prevented.

The louvers 110 inclined slightly downward with respect to the horizontal direction are formed on the left and right side surfaces of the hollow cover 106. Because the openings 108 are covered with the louvers 110 and the grid wall 107 is disposed to form the mesh shape of the openings 108, the rain water hardly penetrates through the openings 108 into the hollow cover 106. Thus, the louvers 110 and the grid wall 107 act also as protection roof or protection barrier for preventing the penetration of the rain water.

Not only the penetration of the rain water but also penetration of snow, dirt, stone, dust, leaf, or the like can be prevented in the present invention. Meanwhile, the hydrogen gas can be readily discharged through the discharge outlets 100 and the openings 108 to the outside.

Even in a case where water or the like penetrates into the discharge outlets 100, the water or the like is collected in the drain chamber 66 located just below the discharge outlets 100 and discharged through the drain tube 76 to the outside of the filter case 40.

The filter case 40 has the guide wall 60 for changing the flow direction of the hydrogen gas. Thus, the filter case 40 has a flow path with a so-called labyrinth structure containing a plurality of bent portions for changing the flow direction of a fluid (such as the hydrogen gas). In the labyrinth structure, the water or the like contained in the drain chamber 66 cannot be moved over the guide wall 60 against gravitational force. Therefore, the water or the like contained in the drain chamber 66 cannot be introduced into the stack case 26. Thus, the penetration of the water or the like into the stack case 26 can be effectively prevented by the direction change chamber 64. Consequently, the penetration of the water or a foreign material into the stack case 26 can be prevented in the present invention.

The present invention is not particularly limited to the above embodiment, and various changes and modifications may be made therein without departing from the scope of the invention.

For example, the fuel cell stack 24 and the stack case 26 may be arranged to the front room 22 in such a manner that the longitudinal direction thereof is made parallel to the front-back direction of the vehicle vehicular body. Also in this case, the ends of the left fuel gas guide passage 38L and the right fuel gas guide passage 38R may extend to the widthwise central part in front of the windshield 20.

The fuel cell vehicle 10 does not have to have both of the left fuel gas guide passage 38L and the right fuel gas guide passage 38R, and one of them may be omitted.

The stacking direction of the power generation cells may be a gravitational direction.

What is claimed is:

1. A fuel gas detector for fuel cells, for detecting a fuel gas leaked from a fuel cell stack fuel cells, comprising a fuel gas guide passage for guiding the fuel gas leaked from the fuel cell stack and a filter case containing a filter for the fuel gas, wherein
the filer case communicates with the fuel gas guide passage via a through-hole formed in an upper portion of the filter case,
the filter is located below the through-hole, and
a fuel gas sensor for detecting the fuel gas transferred through a sampling hole is located in a position facing the filter above the filter.

2. The fuel gas detector according to claim 1, wherein the sampling hole is located upstream of the filter, and the fuel gas flows downward through the filter.

3. The fuel gas detector according to claim 1, comprising two of the fuel gas guide passages and two of the through-holes facing each other in the filter case, wherein the through-holes pass through the filter case and the two fuel gas guide passages are connected to the two through-holes.

4. The fuel gas detector according to claim 3, wherein the fuel gas sensor is located between the two through-holes.

5. The fuel gas detector according to claim 3, wherein a discharge outlet is formed in an upper portion of the filter case so that a fuel gas having flowed through the two fuel gas guide passages is discharged from the discharge outlet.

6. The fuel gas detector according to claim 1, wherein the sampling hole is located at an offset distance from the through-hole.

7. The fuel gas detector according to claim 1, wherein the filter case has a flow path for changing a flow direction of the fuel gas.

8. The fuel gas detector according to claim 1, wherein the fuel gas detector is mounted on a vehicle, a discharge outlet is formed on a vehicular front side of the filter case, so that the fuel gas having flowed through the fuel gas guide passage is discharged from the discharge outlet.

9. The fuel gas detector according to claim 8, wherein the discharge outlet is covered with a cover for guiding the fuel gas in the width direction of the fuel gas detector.

* * * * *